United States Patent
Yamamoto et al.

(10) Patent No.: US 9,902,878 B2
(45) Date of Patent: Feb. 27, 2018

(54) PRESSURE-SENSITIVE ADHESIVE SHEET

(71) Applicant: NITTO DENKO CORPORATION, Ibaraki-shi, Osaka (JP)

(72) Inventors: Shuuhei Yamamoto, Ibaraki (JP); Hironori Tamai, Ibaraki (JP); Kazumichi Kato, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 15/303,804

(22) PCT Filed: Apr. 22, 2015

(86) PCT No.: PCT/JP2015/062184
§ 371 (c)(1),
(2) Date: Oct. 13, 2016

(87) PCT Pub. No.: WO2015/163345
PCT Pub. Date: Oct. 29, 2015

(65) Prior Publication Data
US 2017/0037283 A1   Feb. 9, 2017

(30) Foreign Application Priority Data

Apr. 24, 2014 (JP) .................... 2014-090717
Nov. 20, 2014 (JP) .................... 2014-235851

(51) Int. Cl.
*C09J 7/02* (2006.01)
*C09J 4/00* (2006.01)
(Continued)

(52) U.S. Cl.
CPC .............. *C09J 7/0246* (2013.01); *C09J 4/00* (2013.01); *C09J 7/0285* (2013.01); *C09J 7/0289* (2013.01);
(Continued)

(58) Field of Classification Search
CPC ...... C09J 7/0246; C09J 7/0289; C09J 7/0296; Y10T 428/28; Y10T 428/14; B32B 7/12; B32B 3/30
(Continued)

(56) References Cited

U.S. PATENT DOCUMENTS

2006/0177642 A1   8/2006   Tateo et al.
2008/0213527 A1*  9/2008   Nonaka ............... B32B 27/32
                                              428/41.8
(Continued)

FOREIGN PATENT DOCUMENTS

GB   1 511 060 A      5/1978
JP   10-328231 A     12/1998
(Continued)

OTHER PUBLICATIONS

International Search Report for PCT/JP2015/062184 dated Jul. 7, 2015.

*Primary Examiner* — Catherine A Simone
(74) *Attorney, Agent, or Firm* — Sughrue Mion, PLLC

(57) ABSTRACT

This invention provides a PSA sheet with which degradation of the appearance after its application is efficiently prevented while showing uniform adhesive properties over the entire sheet with greater ease of application. The PSA sheet provided by this invention is an air-impermeable PSA sheet having an adhesive surface. The PSA sheet comprises a PSA layer forming the adhesive surface. In the adhesive surface, at least one groove is formed. The groove runs in a wavy shape in the adhesive surface.

17 Claims, 1 Drawing Sheet

(51) Int. Cl.
*C09J 133/20* (2006.01)
*C09J 133/08* (2006.01)

(52) U.S. Cl.
CPC ........... *C09J 7/0296* (2013.01); *C09J 133/20* (2013.01); *C09J 133/08* (2013.01); *C09J 2201/162* (2013.01); *C09J 2201/28* (2013.01); *C09J 2201/606* (2013.01); *C09J 2400/243* (2013.01); *C09J 2423/106* (2013.01); *C09J 2433/00* (2013.01); *C09J 2433/006* (2013.01); *C09J 2467/006* (2013.01)

(58) Field of Classification Search
USPC ............................... 428/40.1, 41.8, 343, 167
See application file for complete search history.

(56) References Cited

U.S. PATENT DOCUMENTS

| | | | |
|---|---|---|---|
| 2009/0274858 A1* | 11/2009 | Nakagawa | C09J 7/0228 428/41.8 |
| 2010/0196669 A1 | 8/2010 | Hatakenaka | |
| 2010/0233467 A1* | 9/2010 | Niwa | C09J 4/00 428/323 |

FOREIGN PATENT DOCUMENTS

| | | |
|---|---|---|
| JP | 2004-506777 A | 3/2004 |
| JP | 2009-221431 A | 10/2009 |
| JP | 2009-242811 A | 10/2009 |
| JP | 5371292 B2 | 12/2013 |
| WO | 02/14447 A1 | 2/2002 |
| WO | 2009/011396 A1 | 1/2009 |

\* cited by examiner

[Fig. 1]
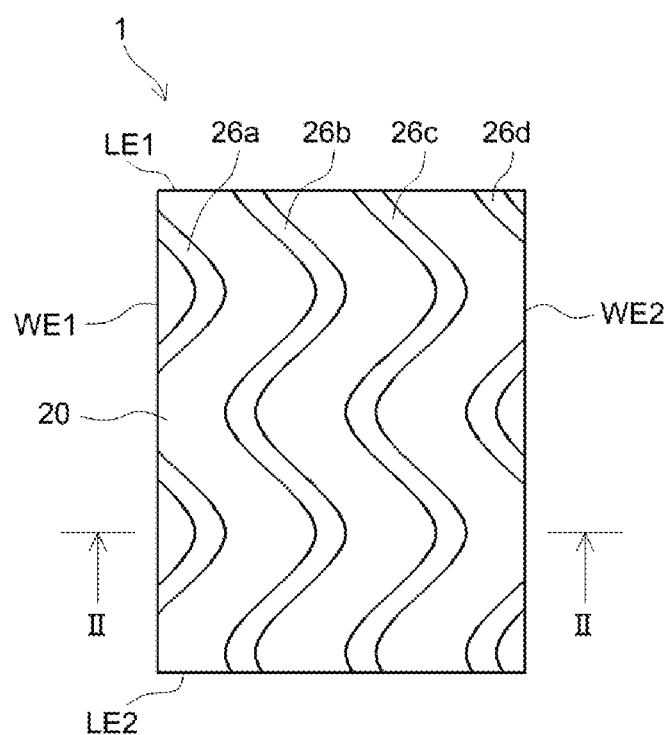
[Fig. 2]
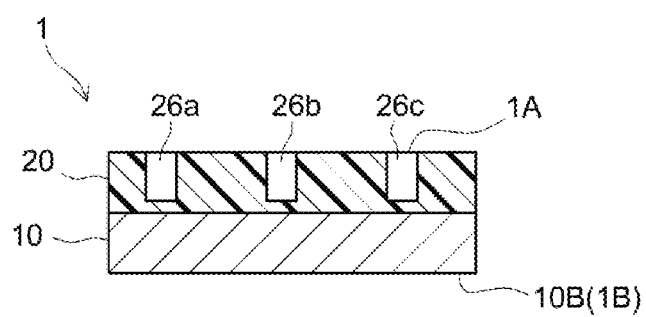

PRESSURE-SENSITIVE ADHESIVE SHEET

CROSS REFERENCE TO RELATED APPLICATIONS

This application is a National Stage of International Application No. PCT/JP2015/062184 filed Apr. 22, 2015, claiming priority based on Japanese Patent Application Nos. 2014-090717 filed Apr. 24, 2014 and 2014-235851 filed Nov. 20, 2014, the contents of all of which are incorporated herein by reference in their entirety.

TECHNICAL FIELD

The present invention relates to a pressure-sensitive adhesive sheet. This application claims priority to Japanese Patent Application No. 2014-090717 filed on Apr. 24, 2014 and Japanese Patent Application No. 2014-235851 filed on Nov. 20, 2014; the entire contents thereof are incorporated herein by reference.

BACKGROUND ART

Pressure-sensitive adhesive (PSA) sheets are widely used for purposes such as protecting surfaces of various objects or obtaining desirable appearances such as decoration. The PSA sheets are also used, for example, as substitutes for paints. Since they have excellent handling properties, their applications are not limited to just paint substitutes, but are expanding. An example of literature disclosing this type of conventional art is Patent Document 1. Patent Documents 2 and 3 are technical literature related to air/vapor-permeable PSA tapes for medical applications.

CITATION LIST

Patent Literature

[Patent Document 1] Japanese Translation of PCT International Application No. 2004-506777
[Patent Document 2] Japanese Patent Application Publication No. H1110-328231
[Patent Document 3] Japanese Patent No. 5371292

SUMMARY OF INVENTION

Technical Problem

When applied to adherends, conventional PSA sheets sometimes degrade the appearance, leaving foreign fluids such as air and moisture between the sheets and the adherends (or in the "adhered areas" for convenience, hereinafter) which result in trapped air, trapped moisture, etc., looking like bubbles. Such trapped air and the like are undesired also in view of having an impact on the adhesive properties, such as causing a decrease in adhesive strength, etc. To avoid such situations, in a known technique (e.g. see Patent Document 1), on the surface of a release liner protecting the adhesive surface of a PSA sheet, protruding ridges are formed, which are used to form grooves in the adhesive surface of the sheet, so that the air and the like looking to be left in the adhered area are released from these grooves. However, in the conventional art, depending on where the sheet is cut off, etc., a groove in the adhesive surface may run in parallel with an edge of the PSA sheet near the edge, thereby leading to the occurrence of events such as decreased adhesiveness near the edge (e.g. edge peel, etc.). When applying the sheet to an adherend, because the level of the adhesive surface is intermittently uneven in the direction of application, the application is affected and tends to be uneven. For instance, when applying the sheet to an adherend using an automated applicator, the reduced ease of application is more likely to be significant. Patent Documents 2 and 3 relate to medical PSA tapes and are silent about maintaining their appearance and even application.

The present invention has been made in view of the circumstances described above with an objective to provide a PSA sheet with which degradation of the appearance after its application can be efficiently prevented while showing uniform adhesive properties over the entire sheet with greater ease of application.

Solution to Problem

This invention provides an air-impermeable PSA sheet having an adhesive surface. The PSA sheet comprises a PSA layer forming the adhesive surface. At least one groove is formed in the adhesive surface. The groove runs in a wavy shape in the adhesive surface.

According to such a configuration, via the grooves in the adhesive surface, foreign fluids such as air and moisture looking to remain in an area adhered to the adherend surface are eliminated from the adhered area, whereby the occurrence of trapped air and the like in the adhered area is prevented. Because the groove runs in the wavy shape, it shows excellent contact with air and the like looking to remain in the adhered area. Accordingly it can efficiently prevent degradation of the appearance caused by the air and the like trapped in the adhered area. The groove running in the wavy shape is less likely to give rise to situations, such as lowered adhesiveness near a width-direction edge (e.g. edge peel, etc.), caused by the groove running in parallel with the edge of the PSA sheet in the vicinity of the edge. This can bring about uniform adhesive properties over the entire PSA sheet. In the embodiment having the groove running in the wavy shape in the adhesive surface, adhesive areas and non-adhesive areas (grooves) are less likely to be broken in the direction of application, thereby bringing about even application as compared to grooves in straight lines or a grid. Thus, even when the number and widths of grooves are increased to enhance the air release properties, relatively good ease of application can be obtained.

When trying to obtain properties to release air and the like in the adhesive surface of a PSA sheet, the first thought is to have air permeability in the thickness direction. However, in applications that require designs, protection, light-blocking properties, etc., it may not be a realistic choice because of impacts on these properties. The art disclosed herein allows release of air and the like in directions in the plane of the PSA sheet. Thus, in an embodiment as described above (typically an embodiment without air permeability in the thickness direction), good air release properties can be obtained.

In a preferable embodiment of the PSA sheet disclosed herein, the at least one groove is two or more grooves placed at intervals in the adhesive surface. In this embodiment, two or more grooves running in wavy shapes are formed in the adhesive surface, whereby the air and the like looking to remain in the adhered area can be more certainly eliminated from the adhered area. When the two or more grooves are arranged so that their running directions are in parallel with each other, a stripe pattern is formed in the adhesive surface, whereby desirable air release properties can be obtained while giving observers the impression that the appearance is kept under control. This brings about an effect to resolve or reduce the feeling of strangeness associated with the external change resulted from the groove formation; it is practically significant in view that the spectrum of application of the PSA sheet can be expanded.

In a preferable embodiment of the PSA sheet disclosed herein, the groove is formed in a curve in the adhesive surface. This embodiment brings about smooth application to adherends, increasing the ease of application. An arrangement that may cause edge peel near the edges of the PSA sheet can be more certainly avoided.

In a preferable embodiment of the PSA sheet disclosed herein, the groove is formed on the PSA layer. This embodiment can favorably achieve a configuration that produces the effects of this invention.

In a preferable embodiment of the PSA sheet disclosed herein, it further comprises a substrate sheet that supports the PSA layer. The inclusion of the substrate sheet increases the stiffness of the PSA sheet and tends to increase the ease of application. The substrate sheet preferably comprises a resin sheet layer. This causes the PSA sheet to have a suitable level of rigidity, thereby further increasing the ease of application. The inclusion of the resin sheet layer is also advantageous in making it thinner, enhancing the appearance, and so on. The ease of application encompasses not only the ease of work for application, but also the ease of obtaining a good state of adhesion.

In a preferable embodiment of the PSA sheet disclosed herein, the PSA layer has a thickness of 2 µm or larger. With the PSA layer having at least a certain thickness, it becomes easier to form grooves having sufficient air release properties.

In a preferable embodiment of the PSA sheet disclosed herein, the PSA sheet has an overall thickness of 300 µm or smaller. The PSA sheet with a limited overall thickness may be advantageous in making products to which the PSA sheet is applied smaller, lighter, resource-saving, etc.

With respect to the PSA sheet disclosed herein, the occurrence of trapped air and the like in adhered areas with adherends is prevented and also even application can be obtained. Accordingly, the PSA sheet can be preferably applied to an embodiment of application to an adherend using an automated applicator where excellent ease of application tends to be required.

With the benefit of the features described above, the PSA sheet disclosed herein can be preferably used in an embodiment where it is applied to an article. Accordingly, the present description provides an article having the PSA sheet disclosed herein applied thereon.

BRIEF DESCRIPTION OF DRAWINGS

FIG. 1 shows a top view schematically illustrating an embodiment of the PSA sheet.

FIG. 2 shows a cross-sectional view at line II-II in FIG. 1.

DESCRIPTION OF EMBODIMENTS

Preferred embodiments of the present invention are described below. Matters necessary to practice this invention other than those specifically referred to in this description may be understood as design matters based on the conventional art in the pertinent field for a person of ordinary skill in the art. The present invention can be practiced based on the contents disclosed in this description and common technical knowledge in the subject field. In the drawings referenced below, a common reference numeral may be assigned to members or sites producing the same effects, and duplicated descriptions are sometimes omitted or simplified. The embodiments described in the drawings are schematized for clear illustration of the present invention, and do not necessarily represent the accurate sizes or reduction scales of the PSA sheet of the present invention provided as an actual product.

FIG. 1 shows a top view schematically illustrating an embodiment of the PSA sheet. FIG. 2 shows a cross-sectional view at line II-II in FIG. 1. With reference to the drawings, the PSA sheet in this embodiment is described.

As shown in FIGS. 1 and 2, PSA sheet 1 according to this embodiment has a laminate structure with a substrate sheet 10 and a PSA layer 20. Substrate sheet 10 supports PSA layer 20. In PSA sheet 1, the surface on the PSA layer 20 side forms an adhesive surface 1A. The other surface 1B (on the substrate sheet 10 side) of PSA sheet 1 is a non-adhesive surface. PSA sheet 1 is a long piece of sheet. In this embodiment, the longitudinal direction in FIG. 1 corresponds to the length direction of PSA sheet 1.

In the surface of the PSA layer 20, grooves 26a, 26b, 26c and 26d are formed. These grooves 26a, 26b, 26c and 26d run continuously in wavy shapes in the length direction and are placed at constant intervals in the width direction of PSA sheet 1. By this, a wavy stripe pattern is formed on the adhesive surface 1A. In this embodiment, grooves 26a, 26b, 26c and 26d all reach the ends of PSA sheet 1.

Each of grooves 26a, 26b, 26c and 26d runs at angles that intersect the width-direction edges WE1 and WE2 of PSA sheet 1. By this, among grooves 26a, 26b, 26c and 26d, the groove 26a next to the width-direction edge WE1 of PSA sheet 1 reaches the edge WE1 at an angle that intersects the edge WE1. Similarly, the groove 26d next to the width-direction edge WE2 of PSA sheet 1 reaches the edge WE2 at an angle that intersects the edge WE2. With respect to length-direction edges LE1 and LE2 of PSA sheet 1, grooves 26a, 26b, 26c and 26d run at angles that intersect the edges LE1 and LE2 to reach the edges LE1 and LE2.

The cross sections of grooves 26a, 26b, 26c and 26d (cross sections that vertically intersect the running direction of the grooves) are U shaped (or rectangular) with top openings.

The widths of grooves 26a, 26b, 26c and 26d can be selected so as to obtain desirable air release properties and adhesive strength and are not particularly limited; they are suitably within a range of about 0.1 mm to 5 mm (preferably 0.3 mm to 3 mm or more preferably 0.5 mm to 2 mm). The groove widths refer to the shortest widths of the grooves at the PSA layer surface.

The interval of the grooves (the width of a segment present between two adjacent grooves in the PSA layer surface) can be selected so as to obtain desirable air release properties and adhesive strength and are not particularly limited; they are suitably within a range of 1 mm to 100 mm (preferably 10 mm to 80 mm, e.g. 20 mm to 60 mm).

The depths of grooves 26a, 26b, 26c and 26d can be selected in accordance with the thickness of the PSA layer. The groove depth is suitably greater than 30% of the thickness of the PSA layer, or preferably greater than 50% (e.g. greater than 70%, typically greater than 80%). The upper limit of the groove thickness relative to the thickness of the PSA layer is suitably less than about 99% (e.g. less than 95%) of the thickness of the PSA layer. In particular, the groove depth is suitably about 0.1 µm to 180 µm (preferably 0.5 µm to 90 m, more preferably 1 µm to 80 µm).

When grooves 26a, 26b, 26c and 26d run continuously in wavy shapes in the length direction, from the standpoint of the air release properties, etc., their amplitude (swinging widths) is suitably within a range of 5 mm to 200 mm (preferably 10 mm to 150 mm or more preferably 40 mm to 100 mm). With respect to a single groove, the amplitude refers to the difference in height between a mountain and a valley (i.e. the wave height) in the wavy shape formed with the single groove, with the difference being in the direction that vertically intersects the direction in which the groove runs (typically the length direction of PSA sheet 1).

When grooves 26a, 26b, 26c and 26d run continuously in wavy shapes in the length direction, for each of grooves 26a, 26b, 26c and 26d, the repeating pitch (or simply the "pitch" hereinafter) can be selected so as to obtain desirable air release properties and adhesive strength and is not particularly limited; it is suitably within a range of 10 mm to 500 mm (preferably 30 mm to 300 mm or more preferably 60 mm to 200 mm). The repeating pitch is typically the wave length which refers to the distance in the running direction of a wave from one peak to its adjacent peak (the distance in the direction (horizontal direction) orthogonal to the vertical direction of the wave).

Prior to use, PSA sheet 1 may have a configuration where the back face 10B (opposite from the PSA layer 20-side surface) is a release face and PSA sheet 1 is wound so that the back face 10B is in contact with the PSA layer 20, whereby the adhesive surface 1A is protected with the back face 10B of substrate sheet 10. Alternatively, it may be a release liner-supported PSA sheet having a configuration where the PSA layer 20 is protected with a release liner (not shown in the drawings) having a release face at least on the adhesive surface 1A side.

As in the embodiment described above, the art disclosed herein can be preferably implemented in an embodiment where the grooves run in wavy shapes with two or more grooves forming a wavy stripe pattern. The shapes and pattern favorably prevent the occurrence of edge peel and the like near the PSA sheet edges, thereby favorably bringing about great ease of application. Examples of the wavy shapes include curves such as sine waves, quasi-sine waves, arc waves and the like as well as non-curves such as zigzag shapes, triangular waves and the like. The wavy pattern may be formed of two or more waves having the same or different shapes, layered with a phase difference or with the shapes or pattern inverted, and so on.

The PSA sheet disclosed herein is characterized by being impermeable to air. Here, that the PSA sheet is impermeable to air means that the sheet has essentially no air permeability (i.e. it is impermeable to air) in the thickness direction of the sheet. According to the art disclosed herein, desirable effects can be obtained with the PSA sheet having air release capabilities not in the thickness direction, but in directions in the plane. In this description, being "air-impermeable" means that the air permeability determined from the time required for 100 mL of air to pass through it exceeds 30 seconds (/100 mL). The PSA sheet preferably has an air permeability of 70 sec/100 mL or higher (e.g. 100 sec/100 mL or higher). The air permeability is measured based on the Gurley test method specified in JIS P 8117:1998.

Despite of the presence of the grooves, the adhesive surface of the PSA sheet having the PSA layer may exhibit a 180° peel strength of 1.5 N/20 mm or greater (e.g. 2 N/20 mm or greater, typically 3 N/20 mm or greater). Accordingly, the PSA sheet disclosed herein can exhibit at least a certain level of adhesive strength while maintaining good air release properties. The 180° peel strength is preferably 5 N/20 mm or greater (e.g. 8 N/20 mm or greater, typically 10 N/20 mm or greater). The 180° peel strength can be measured by the method described below. In particular, the PSA sheet is cut to a 20 mm wide by 100 mm long size to obtain a measurement sample; in an environment at 23° C., 50% RH, the measurement sample is press-bonded over its adhesive surface to the surface of a stainless steel plate (SUS304BA plate) with a 2 kg roller moved back and forth once. The resultant is left standing in the same environment for 30 minutes. Using a universal tensile/compression tester, based on JIS Z 0237:2000, it is then measured for peel strength (N/20 mm) at a tensile speed of 300 mm/min at a peel angle of 180°.

The number of layers in the PSA sheet is not particularly limited. It may have a mono-layer structure consisting of a PSA layer or a multi-layer structure with two or more layers including at least a substrate sheet and a PSA layer. It may have a multi-layer structure with three or more layers including another layer added and laminated.

With respect to the PSA sheet, for instance, when the surface opposite from the adhesive surface requires features such as decoration and surface protection or when it is used as a paint-substitute sheet, it is preferably configured as an adhesively single-faced PSA sheet which is adhesive only on one face. Alternatively, for instance, when it is used for purposes such as binding and fixing, it may be configured as an adhesively double-faced PSA sheet consisting of a PSA layer or as an adhesively double-faced PSA sheet having a PSA layer on each face of its substrate sheet.

The PSA sheet (including the PSA layer(s) and substrate, but excluding release liners) disclosed herein is not particularly limited in overall thickness. It is suitably in a range of about 2 μm to 1000 μm (e.g. 5 μm to 500 μm, favorably 10 μm to 300 μm, typically 15 μm to 100 μm). The PSA sheet with a limited overall thickness can be advantageous in making the product to which the PSA sheet is applied smaller, lighter, resource-saving, and so on.

The PSA layer disclosed herein typically refers to a layer formed of a material (PSA) that exists as a soft solid (a viscoelastic material) in a room temperature range and has a property to adhere easily to adherend with some pressure applied. As defined in "*Adhesion: Fundamental and Practice*" by C. A. Dahlquist (McLaren & Sons (1966), P. 143), the PSA referred to herein is generally a material that has a property satisfying complex tensile modulus $E^*(1\ Hz) < 10^7$ dyne/cm$^2$ (typically, a material that exhibits the described characteristics at 25° C.).

The PSA layer disclosed herein may be formed from a PSA composition such as aqueous, solvent-based, hot-melt and active energy ray-curable kinds. The aqueous PSA composition refers to a PSA composition that comprises PSA (PSA-forming components) in a solvent (an aqueous solvent) comprising water as the primary component, typically including a so-called water-dispersed PSA composition (a composition in an embodiment where at least some of the PSA is dispersed in water). The solvent-based PSA composition refers to a PSA composition in an embodiment comprising PSA in an organic solvent. From the standpoint of reducing environmental stress, an aqueous PSA composition is preferable. From the standpoint of the adhesive properties, etc., a solvent-based PSA composition is preferably used.

The PSA layer disclosed herein may comprise, as its base polymer, one, two or more species among acrylic polymers, rubber-based polymers, polyester-based polymers, urethane-based polymers, polyether-based polymers, silicone-based polymers, polyamide-based polymers, fluorine-based polymers, etc. From the standpoint of the adhesive properties (e.g. peel strength, repulsion resistance), molecular design, etc., acrylic polymers can be preferably used. In other words, the PSA layer is preferably an acrylic PSA layer that comprises an acrylic polymer as its base polymer. The "base polymer" of a PSA refers to the primary component (typically, a component accounting for more than 50% by weight) among polymers in the PSA.

As the acrylic polymer, for example, a polymer of a monomeric starting material comprising an alkyl (meth) acrylate as a primary monomer and possibly comprising a secondary monomer copolymerizable with the primary monomer is preferable. The primary monomer herein refers to a component that accounts for higher than 50% by weight of the monomer composition in the monomeric starting material.

As the alkyl (meth)acrylate, for instance, a compound represented by the following formula (1) can preferably be used:

$$CH_2=C(R^1)COOR^2 \tag{1}$$

Herein, $R^1$ in the formula (1) is a hydrogen atom or a methyl group. $R^2$ is a acyclic alkyl group having 1 to 20 carbon atoms (hereinafter, such a numerical range of carbon atoms may be indicated as "$C_{1-20}$"). From the standpoint of the storage elastic modulus of the PSA, etc., an alkyl (meth)acrylate having a $C_{1-12}$ (e.g. $C_{2-10}$, typically $C_{4-8}$) acyclic alkyl group for $R^2$ is preferable. For the alkyl (meth)acrylate having a $C_{1-20}$ acyclic alkyl group for $R^2$, solely one species or a combination of two or more species can be used. Preferable alkyl (meth)acrylates include n-butyl acrylate and 2-ethylhexyl acrylate.

The secondary monomer copolymerizable with the alkyl (meth)acrylate as the primary monomer may be useful in introducing crosslinking points into the acrylic polymer and increasing the cohesive strength of the acrylic polymer. As the secondary monomer, one, two or more species can be used among functional group-containing monomers such as carboxy group-containing monomers, hydroxy group-containing monomers, acid anhydride group-containing monomers, amide group-containing monomers, amino group-containing monomers, and monomers having nitrogen-containing rings. The secondary monomer may also be a vinyl ester-based monomer such as vinyl acetate, an aromatic vinyl compound such as styrene, a sulfonate group-containing monomer, a phosphate group-containing monomer, etc. For instance, from the standpoint of increasing the cohesive strength, an acrylic polymer in which a carboxy group-containing monomer or a hydroxy group-containing monomer is copolymerized as the secondary monomer is preferable. Preferable examples of the carboxy group-containing monomer include acrylic acid and methacrylic acid. Preferable examples of the hydroxy group-containing monomer include 2-hydroxyethyl acrylate and 4-hydroxybutyl acrylate.

The amount of the secondary monomer is suitably 0.5% by weight of all monomers in the acrylic polymer, or preferably 1% by weight or more. The amount of the secondary monomer is suitably 30% by weight or less of all the monomers, or preferably 10% by weight or less (e.g. 5% by weight or less). When a carboxy group-containing monomer is copolymerized in the acrylic polymer, from the standpoint of combining adhesive strength and cohesive strength, the carboxy group-containing monomer content is preferably within a range of about 0.1% to 10% by weight (e.g. 0.2% to 8%, typically 0.5% to 5% by weight) of all the monomers used in the synthesis of the acrylic polymer. When a hydroxy group-containing monomer is copolymerized in the acrylic polymer, from the standpoint of combining adhesive strength and cohesive strength, the hydroxy group-containing monomer content is preferably within a range of about 0.001% to 10% by weight (e.g. 0.01% to 5%, typically 0.02% to 2% by weight) of all the monomers used in the synthesis of the acrylic polymer. When a vinyl ester-based monomer such as vinyl acetate is copolymerized as the secondary monomer, the vinyl ester-based monomer content is preferably about 30% by weight or less (typically 0.01% to 30% by weight, e.g. 0.1% to 10% by weight) of all the monomers used in the synthesis of the acrylic polymer.

The method for obtaining the acrylic polymer is not particularly limited. Various polymerization methods known as procedures for the synthesis of acrylic polymer can be suitably employed, such as solution polymerization, emulsion polymerization, bulk polymerization and suspension polymerization. For instance, a desirable acrylic polymer can be obtained by dissolving or dispersing a monomer mixture in a suitable polymerization solvent (toluene, ethyl acetate, water, etc.) and carrying out polymerization using a polymerization initiator such as an azo-based polymerization initiator and a peroxide-based initiator.

From the standpoint of combining adhesive strength and cohesive strength in a well-balanced way, the acrylic polymer disclosed herein preferably has a weight average molecular weight (Mw) in a range of $10 \times 10^4$ or higher, but $100 \times 10^4$ or lower. An acrylic polymer whose Mw is $20 \times 10^4$ or higher, but $70 \times 10^4$ or lower (e.g. $30 \times 10^4$ or higher, but $50 \times 10^4$ or lower) may bring about better results. In this description, Mw refers to the value based on standard polystyrene obtained by GPC (gas permeation chromatography).

From the standpoint of increasing the cohesive strength, the PSA composition preferably comprises a crosslinking agent. The type of crosslinking agent is not particularly limited; one, two or more species can be suitably selected and used among heretofore known crosslinking agents. Preferable examples of the crosslinking agent include isocyanate-based crosslinking agents and epoxy-based crosslinking agents. The amount of the crosslinking agent used is not particularly limited. For instance, to 100 parts by weight of the acrylic polymer, it can be selected from a range of about 10 parts by weight or less (e.g. about 0.005 part to 10 parts by weight, preferably about 0.01 part to 5 parts by weight).

The PSA layer disclosed herein may have a composition comprising a tackifier. The tackifier is not particularly limited. Various tackifier resins can be used, such as rosin-based tackifier resin, terpene-based tackifier resin, hydrocarbon-based tackifier resin, epoxy-based tackifier resin, polyamide-based tackifier resin, elastomer-based tackifier resin, phenolic tackifier resin, and ketone-based tackifier resin. These tackifier resins can be used solely as one species or in a combination of two or more species.

The tackifier resin preferably has a softening point (temperature of softening) of about 60° C. or higher (preferably about 80° C. or higher, typically 100° C. or higher). By this, the PSA sheet can be obtained with higher adhesive strength. The upper limit of the softening point of the tackifier resin is not particularly limited; it can be about 180° C. or lower (e.g. about 140° C. or lower). The softening point of tackifier resin referred to herein is defined as the value measured by the softening point test method (ring and ball method) specified either in JIS K5902:2006 or in JIS K2207:2006.

The amount of tackifier resin can be suitably selected in accordance with the target adhesive properties (adhesive strength, etc.). For instance, by solid content, it is preferable to use a tackifier at a ratio of about 10 parts to 100 parts by weight (more preferably 20 parts to 80 parts by weight, or yet more preferably 30 parts to 60 parts by weight) relative to 100 parts by weight of the base polymer (preferably an acrylic polymer).

The PSA composition may comprise, as necessary various additives generally known in the field of PSA compositions, such as leveling agent, crosslinking accelerator, plasticizer, softening agent, filler, anti-static agent, anti-aging agent, UV-absorbing agent, antioxidant and photo-stabilizing agent. With respect to these various additives, heretofore known species can be used by typical methods.

The PSA layer disclosed herein should be formed so that groove in a prescribed shape is on the adhesive surface, but otherwise it is not particularly limited. The PSA layer having the groove in the adhesive surface can be formed by suitably employing a method of screen printing or computer-controlled drawing, scraping, extruding, etc. Alternatively, the grooves can be formed by a method where before or after the formation of the PSA layer is completed by a heretofore known method, groove is formed in the adhesive surface with a groove-forming means such as a roller having wavy ridges; a method where wavy ridges are formed on the release liner surface and grooves are formed in the adhesive surface with these ridges; and like method.

In a preferable embodiment, a scraping method is used as the method for forming the PSA layer. The scraping method allows fast and precise formation of grooves in prescribed shapes. In particular, the scraping method is carried out as follows: Over the most of the release surface of a continuously running support, a PSA composition is evenly applied by a known coating method such as gravure coating; subsequently after partially removal with a scraper, the PSA composition is allowed to cure (typically by drying), whereby a PSA layer with grooves formed on the surface can be obtained. The PSA layer thus obtained on the support can be further transferred to a substrate sheet surface to obtain a PSA sheet in which the PSA layer having grooves on the surface is supported with the substrate sheet. Alternatively it is also possible to employ a method where a substrate sheet is used as the support in the method described above, and the PSA composition applied to the substrate sheet is partially removed, and then the PSA composition is allowed to cure (typically by drying).

As the scraper, it is preferable to use a comb-like scraper having many teeth. By this, a stripe pattern of grooves can be formed in the adhesive surface. In a preferable embodiment, the scraper is moved back and forth at a constant rate in the direction perpendicular to the running direction of the support. By this, wavy grooves can be favorably formed in the adhesive surface of the PSA sheet. According to this method, a desirable pattern (typically a desirable wavy pattern) can be formed by adjusting the feed speed of the support, the number of teeth of the scraper, the rate of the back-and-forth motion, etc.

The cross-sectional shape of the groove formed by the various methods is not particularly limited. For instance, they can be rectangular, square, trapezoidal, triangular, semi-circular, etc. From the standpoint of obtaining good air release properties while reserving a necessary adhesive area, the cross-sectional shape of the groove is preferably rectangular.

The groove depth is not particularly limited. In view of required air release properties, the thickness of the PSA layer, etc., it can be suitably selected. The groove may be formed on the PSA layer as well. In such an embodiment, the groove does not go through the PSA layer completely; and therefore, the PSA (layer) is present at the bottoms of the groove. An area free of the PSA layer may not be present in the entire PSA sheet. This embodiment is efficient in that it is unnecessary to precisely remove the PSA in the areas where the groove is formed and is thus preferable for practical use. This embodiment can also make the PSA sheet impermeable to air.

When the PSA sheet comprises a substrate sheet, the groove may go through the PSA layer completely. In such an embodiment, the resulting area passing through the PSA layer may form PSA-free area in the substrate sheet. In other words, the substrate sheet surface on the side to which the PSA layer is laminated has PSA-bearing area and PSA-free area. The PSA-free area may have the same shape as the groove in the adhesive surface, that is, a shape following a winding course. According to this embodiment, the groove depth is about equal to the thickness of the PSA layer, thereby giving rise to excellent air release properties.

The thickness of the PSA layer disclosed herein is not particularly limited; it can be suitably selected in accordance with the purpose. Usually, from the standpoint of the productivity such as the drying efficiency adhesive properties, etc., it is suitably about 0.5 μm to 200 μm, or preferably about 2 μm to 200 μm (e.g. 5 μm to 100 μm, typically 10 μm to 50 μm). It is advantageous to limit the thickness of the PSA layer in view of making the PSA sheet thinner, smaller, lighter, resource-saving, and so on. According to the art disclosed herein, even in an embodiment having a PSA layer with a limited thickness, the groove depth is capable of being the same as the thickness of the PSA layer; and therefore, in such an embodiment, greater air release properties can be obtained. When the art disclosed herein is implemented in an embodiment of an adhesively double-faced sheet having a PSA layer on each face of a substrate, the thicknesses of the respective PSA layers can be identical or different.

From the standpoint of providing a certain level of stiffness to the sheet so as to increase the ease of application, etc., it is preferable that the PSA sheet in the art disclosed herein further comprises a substrate sheet that can support the PSA layer.

As the substrate sheet, for instance, a resin sheet, paper, cloth, a rubber sheet, a foam sheet, metal foil, a composite or laminate of these, and the like can be used. Among them, from the standpoint of the ease of application and the quality of the sheet appearance (e.g. the attractiveness of the outer surface of the sheet), it preferably comprises a resin sheet layer. The inclusion of the resin sheet is advantageous also from the standpoint of the dimensional stability, thickness precision, workability peel strength, and so on. Preferable examples of the resin sheet include a polyolefinic resin sheet such as of polyethylene and polypropylene; a polyester-based resin sheet such as of polyethylene terephthalate (PET) and polybutylene terephthalate. Among resin sheets, polyester sheets are more preferable and PET sheets are particularly preferable among them. The substrate sheet may have a mono-layer structure or a multi-layer structure with two, three or more layers.

In a preferable embodiment, the substrate sheet is a substrate comprising a foam sheet (a foam-containing substrate). This provides impact-absorbing capabilities to the PSA sheet. Here, the foam sheet refers to a sheet structure having a part with foam cells (a foam cell structure). The foam-containing substrate may be a mono-layer structure formed from a foam sheet or a multi-layer structure wherein at least one of whose two or more layers is formed of a foam sheet (a foam layer). A configurational example of the foam-containing substrate is a composite substrate in which a foam sheet (a foam layer) and a non-foamed sheet (a non-foamed layer) are laminated. The non-foamed sheet (non-foamed layer) refers to a sheet structure that has not been subjected to a purposeful foaming process (e.g. a process to incorporate foam cells), referring to a sheet essentially free of a foam cell structure. A typical example of the foam sheet is a resin sheet (e.g. a polyester-based resin sheet such as of PET) having an expansion rate of less than 1.1-fold (e.g. less than 1.05-fold, typically less than 1.01-fold). When the substrate sheet comprises two or more foam layers, the materials and structures of these foam layers can be identical or different. When the foam sheet has a multi-layer structure that includes a foam layer, from the standpoint of increasing the tightness between layers, adhesive layers may be placed between the layers.

The foam sheet is not particularly limited in average foam cell diameter; it is usually suitably 10 μm to 200 μm, preferably 20 μm to 180 μm, or more preferably 30 μm to 150 μm. When the average foam cell diameter is 10 μm or larger, the impact-absorbing properties tend to increase. On the other hand, when the average foam cell diameter is 200 μm or smaller, the handling properties and waterproof properties (water-blocking properties) tend to increase. The average foam cell diameter is measured by the method described later in Examples.

The foam sheet is not particularly limited in density (apparent density); it is usually suitably 0.01 g/cm$^3$ or higher, preferably 0.01 g/cm$^3$ to 0.7 g/cm$^3$, or more preferably 0.02 g/cm$^3$ to 0.5 g/cm$^3$. When the density is 0.01 g/cm$^3$ or higher, the strength of the foam sheet (and even that of the PSA sheet) will increase with a tendency toward greater impact resistance and handling properties. On the other hand, when the density is 0.7 g/cm$^3$ or lower, the conformability to a difference in level tends to increase without an excessive decrease in flexibility. The density of the foam sheet is measured by the method described later in Examples.

The 50% compressive stress of the foam sheet is not particularly limited. From the standpoint of the impact resistance, the foam sheet suitably shows a 50% compressive stress of 0.1 N/cm$^2$ or greater. When the 50% compressive stress is at or above a certain value, for instance, even if the foam sheet is thin (e.g. about 100 μm thick), it can show sufficient resistance when compressed (resilience to compression) and maintain good impact resistance. The 50% compressive stress is preferably 0.2 N/cm$^2$ or greater, or more preferably 0.5 N/cm$^2$ or greater. From the standpoint of combining flexibility and impact resistance in a well-balanced way, the 50% compressive stress is suitably 8 N/cm$^2$ or less, preferably 6 N/cm$^2$ or less, more preferably 3 N/cm$^2$ or less, or yet more preferably 2 N/cm$^2$ or less. The 50% compressive stress is measured based on JIS K 6767:1999. More specifically, it is measured by the method described later in Examples.

The foam constituting the foam sheet disclosed herein is not particularly limited in foam cell structure. The foam cell structure can be a continuous foam cell structure, an isolated foam cell structure, or a semi-continuous foam cell structure. From the standpoint of the impact absorbing properties, continuous and semi-continuous foam cell structures are preferable.

The material of the foam sheet is not particularly limited. The foam sheet can be typically formed from a material comprising a polymer component (e.g. a thermoplastic polymer). A preferable foam sheet is usually formed of foam of a plastic material (plastic foam). The plastic material (which means to include a rubber material) for forming the plastic foam is not particularly limited; a suitable species can be selected among known plastic materials. For the plastic material (typically a thermoplastic polymer), solely one species or a combination of two or more species can be used. The primary component (typically a component accounting for more than 50% by weight) among the polymers in the substrate sheet or the foam sheet may be referred to as the "base polymer" hereinafter.

Specific examples of the foam include polyolefinic resin foam such as polyethylene foam and polypropylene foam; polyester-based foam such as polyethylene terephthalate foam, polyethylene naphthalate foam and polybutylene terephthalate foam; polyvinyl chloride-based resin foam such as polyvinyl chloride foam; vinyl acetate-based foam; acrylic resin foam; polyphenylene sulfide resin foam; amide-based resin foam such as polyamide (nylon) resin foam and all-aromatic polyamide (aramide) resin foam; polyimide-based resin foam; polyether ether ketone (PEEK) foam; styrene-based resin foam such as polystyrene foam; and urethane-based resin foam such as polyurethane resin foam. As the foam, rubber-based resin foam such as polychloroprene rubber foam can be used as well.

In a preferable embodiment, acrylic resin foam is used as the foam. Here, the acrylic resin foam refers to foam comprising an acrylic polymer as the base polymer. The acrylic polymer in this description is as defined earlier. As the alkyl (meth)acrylate forming the acrylic polymer, one, two or more species can be preferably used among alkyl (meth)acrylates having acyclic alkyl groups with 1 to 20 (preferably 1 to 8, typically 1 to 4) carbon atoms. Preferable examples of the alkyl (meth)acrylate include ethyl acrylate, n-butyl acrylate and 2-ethylhexyl acrylate. The amount of the alkyl (meth)acrylate as the primary monomer is suitably 70% by weight or more of all monomers in the acrylic polymer, or preferably 75% by weight or more (e.g. 80% by weight or more). The amount of the alkyl (meth)acrylate is suitably 98% by weight or less of all the monomers, or preferably 97% by weight or less (e.g. 96% by weight or less).

The secondary monomer co-polymerizable with the alkyl (meth)acrylate as the primary monomer may be useful in introducing crosslinking points in the acrylic polymer or in increasing the cohesive strength of the acrylic polymer. As the secondary monomer, one, two or more species of functional group-containing monomers can be used among, for instance, carboxy group-containing monomers, hydroxy group-containing monomers, acid anhydride group-containing monomers, amide group-containing monomers, amino group-containing monomers, cyano group-containing monomers, monomers having nitrogen atom-containing rings and the like. The secondary monomer can also be a vinyl ester-based monomer such as vinyl acetate, an aromatic vinyl compound such as styrene, a sulfonate group-containing monomer, a phosphate group-containing monomer and the like. From the standpoint of the repulsion resistance, etc., an acrylic polymer in which, for instance, a cyano group-containing monomer such as acrylonitrile and methacrylonitrile is copolymerized is preferable. The amount of the secondary monomer is suitably 0.5% by weight or more of all monomers in the acrylic polymer, or preferably 1% by weight or more. The amount of the secondary monomer is suitably 30% by weight or less of all the monomers, or preferably 10% by weight or less.

When the foam is formed with an emulsion-based resin composition by a foaming method where gases including air are mixed in mechanically such as by stirring, it is preferable that the monomers forming the acrylic polymer comprise a nitrogen atom-containing monomer as the secondary monomer. This facilitates the formation of foam cells in the foaming process and may increase the viscosity of the composition when forming the foam (typically when drying the resin composition), whereby the foam cells are readily kept in the foam body.

Examples of the nitrogen atom-containing monomer include cyano group-containing monomers such as acrylonitrile and methacrylonitrile; lactam ring-containing monomers such as N-vinyl-2-pyrolidone; amide group-containing monomers such as (meth)acrylamide, N-hydroxyethyl (meth)acrylamide, N-methylolacrylamide, N,N-dimethylacrylamide, N,N-diethylacrylamide and diacetone acrylamide. These can be used solely as one species or in a combination of two or more species. Among them, cyano group-containing monomers such as acrylonitrile and lactam ring-containing monomers such as N-vinyl-2-pyrolidone are preferable.

The amount of the nitrogen atom-containing monomer is suitably 2% by weight or more of all monomers in the acrylic polymer, or preferably 3% by weight or more (e.g. 4% by weight or more). The amount of the nitrogen atom-containing monomer is suitably 30% by weight or less of all the monomers, or preferably 25% by weight or less (e.g. 20% by weight or less).

The method for obtaining the acrylic polymer is not particularly limited. Various polymerization methods known as procedures for the synthesis of acrylic polymer can be suitably used, such as solution polymerization, emulsion polymerization, bulk polymerization, suspension polymerization, active energy ray polymerization (e.g. UV polymerization). For instance, a desirable acrylic polymer can be obtained by dissolving or dispersing a monomer mixture in a suitable polymerization solvent (toluene, ethyl acetate, water, etc.) and carrying out polymerization using a polymerization initiator such as an azo-based polymerization initiator and a peroxide-based initiator. In view of the ease of foaming and environmental aspects, it is preferable to use acrylic resin foam (emulsion-based acrylic resin foam) obtained by emulsion polymerization.

From the standpoint of increasing the cohesive strength, the acrylic resin foam-forming composition preferably comprises a crosslinking agent. The type of crosslinking agent is not particularly limited. Among various crosslinking agents, one, two or more species can be suitably selected and used. Favorable examples of the crosslinking agent include isocyanate-based crosslinking agents, epoxy-based crosslinking agents, oxazoline-based crosslinking agents, carbodiimide-based crosslinking agents, melamine-based crosslinking agents and metal oxide-based crosslinking agents. In particular, oxazoline-based crosslinking agents are preferable. The amount of the crosslinking agent used is not particularly limited. To 100 parts by weight of the acrylic polymer, it is suitably selected from a range of about 10 parts by weight or less (e.g. about 0.005 part to 10 parts by weight, preferably about 0.01 part to 5 parts by weight).

In another preferable embodiment, polyolefinic resin foam is used as the foam. As the plastic material forming the polyolefinic foam, various known or commonly-used polyolefinic resins can be used without particular limitations. Examples include polyethylene such as low density polyethylene (LDPE), linear low density polyethylene (LLDPE), high density polyethylene (HDPE) and metallocene catalyst-based linear low density polyethylene; polypropylene; ethylene-propylene copolymer; and ethylene-vinyl acetate copolymer. Among these polyolefinic resins, solely one species or a combination of two or more species can be used.

From the standpoint of the impact resistance, waterproof properties, etc., favorable examples of the foam sheet in the art disclosed herein include a polyethylene-based foam sheet essentially formed of polyethylene-based resin foam and a polypropylene-based foam sheet essentially formed of polypropylene-based resin foam. Here, the polyethylene-based resin refers to resin formed from ethylene as the primary monomer (i.e. the primary component among the monomers) and may include HDPE, LDPE and LLDPE as well as ethylene-propylene and ethylene-vinyl acetate copolymers of which ethylene is copolymerized at a ratio above 50% by weight. Similarly, the polypropylene-based resin refers to resin formed from propylene as the primary monomer. As the foam sheet in the art disclosed herein, a polypropylene-based foam sheet can be preferably used.

The foaming method for the foam sheet is not particularly limited. In accordance with the purpose, ease of procedures, etc., chemical procedures, physical procedures and so on can be employed individually or in combination. From the standpoint of the contamination, etc., physical foaming methods are preferable. Specific examples include a foaming method where a sheet-forming material is prepared to contain a foaming agent such as a low boiling compound (e.g. a hydrocarbon) and thermally expandable microspheres and foam cells are formed from the foaming agent, a foaming method where gases such as air are mechanically mixed in, a foaming method by solvent removal which takes advantage of removal of a solvent such as water, and a foaming method using a supercritical fluid. For instance, a method where an inert gas (e.g. carbon dioxide) is injected into the foam sheet-forming polymer under increased pressure and the resultant is placed under reduced pressure to form a foam sheet. By this method, the average foam cell diameter can be easily controlled to be at or below a certain value and the foam sheet can be easily made to have a lower density.

The foam sheet is fabricated by employing a foaming method as described above. The formation of the foam sheet is not particularly limited. For instance, when employing a foaming method that mechanically admixes gases such as air, a resin composition (e.g. an emulsion-based resin composition) containing foam can be subsequently applied over a substrate or release paper, etc., and allowed to dry to obtain a foam sheet. From the standpoint of the foam stability, etc., the drying preferably includes a preliminary drying step at or above 50° C., but below 125° C. as well as a main drying step at 125° C. to 200° C. Alternatively foam can be formed continuously into a sheet using a calendar, extruder, conveyer belt casting and so forth; or a method where a kneaded mixture of foam-forming materials is foamed and molded in a batch process can be employed. In forming the foam sheet, a surface layer may be removed by slicing to adjust the sheet to obtain desirable thickness and foam characteristics.

The thermoplastic polymer (e.g. a polyolefinic polymer) that can be included in the foam sheet may comprise a thermoplastic elastomer that exhibits properties of rubber at room temperature, but shows thermoplasticity at a high temperature. From the standpoint of the flexibility and conformability, one, two or more species can be used among thermoplastic elastomers, for instance, olefinic elastomers such as ethylene-propylene copolymer, ethylene-propylene-diene copolymer, ethylene-vinyl acetate copolymer, polybutene, polyisobutylene, and chlorinated polyethylene; styrene-based elastomers such as styrene-butadiene-styrene copolymer; thermoplastic polyester-based elastomers; thermoplastic polyurethane-based elastomers; and thermoplastic acrylic elastomers. Among them, a thermoplastic elastomer having a glass transition temperature of room temperature or lower (e.g. 20° C. or lower). The thermoplastic elastomer content in the foam sheet is preferably about 10% to 90% by weight (e.g. 20% to 80% by weight) of the thermoplastic polymer in the foam sheet.

From the standpoint of the ease of mixing a foam-forming gas and the foam stability as the foaming agent, various surfactants can be used in the foam sheet-forming material (e.g. an emulsion-based acrylic resin composition), with examples including anionic surfactants, cationic surfactants, nonionic surfactants and amphoteric surfactants. Hydrocarbon-based and fluorine-based surfactants can be used as well. In particular, from the standpoint of reducing the foam cell diameters and stabilizing the foam, anionic surfactants are preferable; ammonium salts of fatty acids (typically ammonium salts of higher fatty acids) such as ammonium stearate are more preferable. For the surfactant, solely one species or a combination of two or more species can be used. The surfactant content is preferably about 0.1 part to 10 parts by weight (e.g. 0.5 part to 8 parts by weight) to 100 parts by weight of the base polymer of the foam sheet. The foaming agent in this description includes not only an agent that shows foaming capabilities, but also a foam cell diameter-adjusting agent to reduce the foam diameters as well as a foam stabilizer such as a foam-adjusting agent.

When the foam sheet-forming material is an aqueous dispersion (e.g. an acrylic emulsion), it is preferable to use a silicone-based compound as the foaming agent. By this, the recovery of thickness (the degree and speed of recovery) after compression tends to improve. A preferable silicone-based compound has 2000 or fewer siloxane bonds. Examples of the silicone-based compound include silicone oil, modified silicone oil, and silicone resin. In particular, dimethyl silicone oil and methyl phenyl silicone oil are preferable. As the silicone-based compound, a silicone-modified polymer (e.g. a silicone-modified acrylic polymer, a silicone-modified urethane-based polymer, etc.) can be used as well. These can be used solely as one species or in a combination of two or more species. The silicone compound content is preferably about 0.01 part to 5 parts by weight (e.g. 0.05 part to 4 parts by weight, typically 0.1 part to 3 parts by weight) to 100 parts by weight of the base polymer of the foam sheet.

From the standpoint of stabilizing the foam and increasing the ease of sheet formation, the foam sheet-forming material (e.g. an emulsion-based acrylic resin composition) may comprise a thickener. The thickener is not particularly limited. Examples include acrylic acid-based thickeners, urethane-based thickeners and polyvinyl alcohol-based thickeners. In particular, polyacrylic acid-based thickeners and urethane-based thickeners are preferable. The thickener content is preferably about 0.1 part to 10 parts by weight (e.g. 0.1 part to 5 parts by weight) to 100 parts by weight of the base polymer of the foam sheet.

When a foam-containing substrate is used as the substrate sheet, the foam sheet preferably comprises a foam-nucleating agent such as a metal hydroxide (e.g. magnesium hydroxide). This tends to facilitate the adjustment of the average foam cell diameter in the foam sheet to obtain desirable impact-absorbing properties, flexibility and so on. The foam-nucleating agent can be a metal oxide, composite oxide, metal carbonate, metal sulfate, etc. The foam-nucleating agent content is preferably about 0.5 part to 125 parts by weight (e.g. 1 part to 120 parts by weight) to 100 parts by weight of the base polymer of the foam sheet.

When using a foam-containing substrate as the substrate sheet, from the standpoint of inhibiting the foam from degassing while foam cells are being formed, the foam sheet preferably comprises a degassing inhibitor such as fatty acid amides. A more preferable fatty acid amide has a bis-amide structure. The degassing inhibitor can be a metal salt of a fatty acid as well. The degassing inhibitor content is preferably about 0.5 part to 10 parts by weight (e.g. 0.7 part to 8 parts by weight, typically 1 part to 6 parts by weight) to 100 parts by weight of the base polymer of the foam sheet.

The substrate sheet (e.g. a foam sheet) may comprise a softener so as to provide desirable fluidity to the sheet-forming material thereby to improve properties such as flexibility. With the inclusion of a softener in the foam sheet, properties such as ease of stretching the sheet and expansion ratio can be preferably adjusted. For example, one, two or more species can be preferably used among hydrocarbon-based softeners such as liquid paraffin, paraffin wax, micro wax and polyethylene wax; ester-based softeners such as glyceryl stearate; and fatty acid-based softeners. The softener content is preferably 0.5 part to 50 parts by weight (e.g. 0.8 part to 40 parts by weight, typically 1 part to 30 parts by weight) to 100 parts by weight of the base polymer of the substrate sheet (e.g. a foam sheet).

When emulsion-based acrylic resin foam is used, an arbitrary anticorrosive may be included to prevent corrosion of metal parts adjacent to the foam sheet. As the anticorrosive, an azole ring-containing compound is preferable. With the use of an azole ring-containing compound, inhibition of metal corrosion and tight adhesion to adherends can be combined at a high level. In particular, a compound with the azole ring forming a fused ring with an aromatic ring such as a benzene ring is preferable; benzotriazole-based compounds and benzothiazole-based compounds are especially preferable. The anticorrosive content is preferably about 0.2 part to 5 parts by weight (e.g. 0.3 part to 2 parts by weight) to 100 parts by weight of the base polymer of the foam sheet.

To obtain desirable designs and optical properties, the substrate sheet (e.g. a resin sheet) may be colored black, white or other with various types of colorant (e.g. pigment) content. As a black colorant, carbon black is preferable. It is also possible to employ a method where at least one surface (one or each face) of the substrate sheet is subjected to printing to overlay one, two or more colored layers (e.g. a black layer and a white layer).

To the substrate sheet (e.g. a resin substrate sheet, a foam substrate sheet), various additives may be added as necessary such as filler (inorganic filler, organic filler, etc.), anti-aging agent, antioxidant, UV ray absorber, antistatic agent, slip agent and plasticizer.

The substrate sheet disclosed herein may be impermeable to air. In the art disclosed herein, the PSA sheet has air release capabilities in directions in the plane. Accordingly, even in an embodiment where the substrate sheet is impermeable to air, desirable effects can be obtained. This is significant in view of providing greater freedom with respect to the structure and material of the substrate. When the substrate sheet is impermeable to air, its air permeability usually exceeds 30 sec (/100 mL). The air permeability is preferably 70 sec/100 mL or higher (e.g. 100 sec/100 mL or higher).

From the standpoint of the ease of application, etc., the substrate sheet disclosed herein may exhibit low elongation properties. In particular, the substrate sheet may have an elongation at break of less than 1000% when measured based on JIS K 6767:1999. The elongation at break of the substrate sheet may be less than 700% (e.g. less than 500%, typically less than 200%).

When the PSA sheet is adhesive on one face, between the two surfaces of the substrate sheet, the surface (back face) opposite from the surface to be provided with a PSA layer is preferably made smooth. According to the art disclosed herein, when an adhesively single-faced PSA sheet is wound to bring the back face of the substrate sheet in contact with the PSA layer surface, a groove can be formed in the adhesive surface of the PSA sheet to allow passage of air and the like without subjecting the back face to a process such as embossing. The aforementioned smooth surface may be the outer face of the PSA sheet; and therefore, when the PSA sheet having the smooth surface is used as, for instance, a decorative sheet or a surface protection sheet, it may provide a better appearance (design). In a preferable embodiment, from the standpoint of the adhesive properties and the quality of appearance (design), the back face of the substrate sheet may have an arithmetic mean surface roughness of 1 µm or less (e.g. about 0.05 µm to 0.75 µm, typically about 0.1 µm to 0.5 µm). In this description, the arithmetic mean surface roughness can be measured using a general surface roughness gauge (e.g. non-contact three-dimensional surface profilometer under model name WYKO NT-3300 available from Veeco).

When an adhesively single-faced PSA sheet is wound to bring the back face of the substrate sheet in contact with the PSA layer surface, the back face (opposite from the surface to be provided with a PSA layer) of the substrate sheet may be subjected as necessary to a release treatment with a silicone-based, long chain alkyl-based, fluorine-based release agent or the like. The release treatment brings about effects such as easier unwinding of the PSA sheet wound in a roll. On the other hand, the PSA layer-side surface of the substrate sheet may be subjected to a heretofore known surface treatment such as corona discharge treatment and primer coating for purposes such as increasing the tightness of adhesion between the substrate and the PSA layer.

The thickness of the substrate sheet is not particularly limited and can be suitably selected in accordance with the purpose. In general, the substrate thickness is suitably 1 µm or larger (e.g. about 2 µm to 500 µm), or preferably about 5 µm to 500 µm (e.g. 10 µm to 200 µm, typically 15 µm to 100 µm). It is advantageous to limit the thickness of the substrate sheet in view of making the PSA sheet thinner, smaller, lighter, resources-saving, and so on.

When the substrate sheet comprises a foam sheet, the thickness of the foam-containing substrate (e.g. a foam substrate sheet) can be suitably selected in accordance with the strength and flexibility of the PSA sheet, intended purposes and so on. From the standpoint of the impact-absorbing properties, etc., the foam-containing substrate has a thickness of suitably 30 µm or larger, preferably 50 µm or larger, or more preferably 60 µm or larger (e.g. 80 µm or larger). From the standpoint of making the PSA sheet thinner, smaller, lighter, resource-saving, and so on, the thickness of the foam-containing substrate is usually suitably 1 mm or smaller. The use of the foam sheet disclosed herein can bring about excellent impact-absorbing capabilities even when the thickness is about 350 µm or smaller (more preferably 250 µm or smaller, e.g. 180 µm or smaller). The thickness of the foam sheet (possibly a foam layer) in the foam-containing substrate can also be preferably selected from the ranges exemplified as the thickness of the aforementioned foam-containing substrate.

The art disclosed herein may be implemented in an embodiment of a release liner-supported PSA sheet having a release liner that protects the adhesive surface of the PSA sheet. As the release liner, any conventional release paper or the like can be used without any particular limitations. For example, a release liner having a release layer on a surface of a liner substrate such as a resin sheet and paper; a release liner formed from a poorly-adhesive material such as a fluorine-based polymer (polytetrafluoroethylene, etc.) or a polyolefin-based resin (polyethylene, polypropylene, etc.); or the like can be used. The release layer can be formed, for instance, by subjecting the liner substrate to a surface treatment with a release agent such as a silicone-based, a long-chain alkyl-based, a fluorine-based, a molybdenum disulfide-based release agent or the like.

By the art disclosed herein, it is possible to form a groove in the adhesive surface of the PSA sheet to allow passage of air and the like, without subjecting the release liner surface to a process such as embossing. Accordingly, in a preferable embodiment, the release liner's release surface (on the side to be in contact with the adhesive surface of the PSA sheet) is formed smooth. From the standpoint of obtaining good adhesive properties, the release surface of the release liner has an arithmetic average surface roughness of 1 µm or less (e.g. about 0.05 µm to 0.75 µm, typically about 0.1 µm to 0.5 µm). The thickness (overall thickness) of the release liner is not particularly limited. From the standpoint of the ease of removal, handling properties, strength, etc., it is preferably about 10 µm to 500 µm (e.g. 15 µm to 100 µm, typically 20 µm to 40 µm).

The concept of the PSA sheet in this description includes so-called PSA sheets, PSA tapes, PSA labels and PSA film. The PSA sheet disclosed herein may be flat or in a roll. Alternatively, the sheet may be in forms further processed into various shapes.

The PSA sheet is a long piece in the present embodiment, but the art disclosed herein is not limited to this. The PSA sheet can be processed into various shapes, for example, square shapes. As used herein, besides a typical strip-like shape, the "long piece" encompasses a shape formed with a long piece in a joined loop such as the frame shape and ring shape described later because it is formed of a long piece just with the ends of the length direction joined together. Thus, this is also included.

As described above, in applying the PSA sheet disclosed herein to an adherend, the occurrence of trapped air and the like can be efficiently prevented at the interface with the adherend. Thus, in either application method between application by hand (manual application) and application with an automated applicator or the like (automated application), the ease of application will improve. For example, when applied by manual application, the degree of dependence on skills of individuals can be reduced, thereby bringing about advantages such as increases in efficiency and quality of the application and their stabilization. When applied by automated application, failed application with air and the like trapped in adhered areas and reapplication work can be reduced. Accordingly either by manual application or by automated application, it is possible to bring about increases in application efficiency and quality stabilization of the quality and so on, thereby increasing the productivity and quality of products made with the use of the PSA sheet as well. The art disclosed herein can provide more even application; and therefore, it is particularly favorable as a PSA sheet in an embodiment for application using an automated applicator.

Between the PSA sheet and the adherend, the air trapping and the like may occur, not just during the application, but also after the application as the time passes. In typical, after the PSA sheet is applied, upon storage and use in an environment at a relatively high temperature (e.g. 35° C. or higher), etc., the air trapping and the like may occur in the adhered area, causing degradation of the appearance. For instance, such high temperature conditions are likely to be reached in factories and outdoor in summer, inside electronics, etc. Even when used for applications exposed to such high temperature environments, the art disclosed herein can prevent the occurrence of trapped air and the like in the adhered area and inhibit degradation of the appearance for a long time.

With the benefit of the features described above, the PSA sheet disclosed herein can be preferably used for application to surfaces of various articles. In a preferable embodiment, it can be used as various kinds of decorative sheet and surface protection sheet, a fixing sheet for printing plates of flexographic printing and the like, a light-blocking sheet, and so on. For instance, it is preferable as a decorative sheet (typically a paint-substitute sheet) applied to vehicle exteriors, house building materials, and so on. It is also preferable for use inside electronics such as TVs as a cover sheet used to increase the smoothness of the outer face of a chassis or to cover uneven places such as of screw holes in surfaces of various parts. The use of such a cover sheet can decrease unevenness of the appearance over the covered surface and make the dimensional precision uniform. It can also be preferably used as an exterior sheet for battery packs for which the appearance is important.

Even when made thin, with the PSA sheet disclosed herein, it is possible to prevent degradation of appearance quality after its application while maintaining good adhesive properties. Thus, it can be preferably used for applications (e.g. for mobile electronics) where a thinner build and a lighter weight are required desirably with saving of resources. In particular, it can be preferably used for purposes such as the surface protection sheet for mobile electronics (e.g. mobile phones, smartphones, tablet computers, notebook computers, etc.), binding and fixing of liquid crystal displays in the mobile electronics, fixing protection panels (lenses) to protect the displays of the mobile electronics, and fastening key module parts of mobile phones. When used for the mobile electronics, the PSA sheet may have a shape in accordance with the purpose and so on, such as a frame shape and a strip shape. In this description, to be "mobile," it is not sufficient that it can be just carried, but it needs to be mobile enough for an individual (an average adult) to be able to carry it by hand relatively easily.

Several Examples related to the present invention are described below, but the present invention is not intended to be limited to these Examples. In the description below, "parts" and "%" are by weight unless otherwise noted.

<Foam Sheet Fabrication Example 1>

With a disperser (product name ROBOMIX available from Primix Corporation), were stirred, mixed and foamed 100 parts of an aqueous dispersion (55% solid content) containing an emulsion-polymerized acrylic copolymer of ethyl acrylate, n-butyl acrylate and acrylonitrile copolymerized at a ratio of 45:48:7; 1 part of a silicone-based compound (dimethyl silicone oil, number average molecular weight 7.16×10, weight average molecular weight 1.71×10$^4$, 100% solid content (non-volatiles)); 3 parts of a fatty acid ammonium salt surfactant (a water dispersion of ammonium stearate, 33% solid content); 2 parts of an oxazoline-based crosslinking agent (product name EPOCROS WS-500 available from Nippon Shokubai Co., Ltd. 39% solid content); and 0.8 part of a polyacrylic acid-based thickener (ethyl acrylate-acrylic acid copolymer at 20% acrylic acid (copolymerization ratio), 28.7% solid content). The foamed mixture was applied over 38 μm thick PET film subjected to release treatment on one face (product name MRF #38 available from Mitsubishi Plastics, Inc.) and allowed to dry at 70° C. for 4.5 minutes and then at 140° C. for 4.5 minutes to fabricate an acrylic resin foam sheet A. The foam sheet A has a continuous foam cell structure that is 100 μm in thickness, 0.34 g/cm$^3$ in apparent density 65.7% in foam fraction, 72.5 μm in maximum foam cell diameter, 28.5 μm in minimum foam cell diameter, and 45 μm in average foam cell diameter. Its air permeability is at most 30 sec/100 mL.

<Foam Sheet Fabrication Example 2>

With a double shaft kneader (available from Japan Steel Works, Ltd.), at 200° C., were kneaded 45 parts of polypropylene (melt flow rate (MFR) 0.35 g/10 min), 55 parts of a mixture of polyolefin-based elastomer and softener (paraffin-based extender oil), 10 parts of magnesium hydroxide, 10 parts of carbon (product name ASAHI #35 available from Asahi Carbon Co., Ltd.), 1 part of glyceryl stearate and 1.5 parts of lauric acid bis-amide (bis-lauramide). The kneaded mixture was extruded in a strand, cooled with water and then molded into pellets. The pellets were placed in a single shaft extruder (available from Japan Steel Works, Ltd.). In an atmosphere at 220° C., $CO_2$ gas was injected at 13 MPa (12 MPa after injected) to 5.6% of the total amount of the pellets. After sufficient saturation with $CO_2$ gas followed by cooling to a temperature suited for foaming, the mixture was extruded into a cylindrical shape from a die and the cylindrical foam was cut into a line along a radial direction and spread out as a sheet to obtain a long piece of raw foam sheet. The raw foam sheet was 55 μm in average foam cell diameter and 0.041 g/cm$^3$ in apparent density. As for the polyolefinic elastomer/softener mixture, 30 parts of a softener mixed with 100 parts of a polyolefinic elastomer was used. The mixture was 6 g/10 min in MFR (230° C.) and 790 in JIS A hardness.

The resulting raw foam sheet was processed, using a continuous slicing machine used in Examples in Japanese Patent Application Publication No. 2013-100459 and a continuous processing machine having a heating roller (induction heating roller) with gap adjustment capabilities. In particular, the raw foam sheet was cut by a slitting process to a prescribed width. Using a continuous slicing machine, a layer with a low degree of foaming was sliced off from each face. The sheet was passed through the continuous processing machine set at an induction heating roller temperature of 160° C. with a 0.20 mm gap to thermally melt one face and was subjected to a slit processing. The resultant was wound at a rate of 20 m/min to obtain a roll. Subsequently the roll was unwound and passed through the continuous processing machine set at an induction heating roller temperature of 160° C. with a 0.10 mm gap, whereby the other face which had not been melted was thermally melted and subjected to a slit processing. The resultant was wound to fabricate a polypropylene-based (PP-based) resin foam sheet B with a thermally treated face on each face. The foam sheet B has a continuous foam cell structure that is 100 μm in thickness, 0.12 g/cm$^3$ in apparent density 88% in foam fraction, 90 μm in maximum foam cell diameter, 30 μm in minimum foam cell diameter, and 60 μm in average foam cell diameter. Its air permeability is 133 sec/100 mL.

[Average Foam Cell Diameter of Foam Sheet]

The average foam cell diameters of the foam sheets were determined by the following method. In particular, using a low-vacuum scanning electron microscope (product name S-3400N scanning electron microscope, available from Hitachi High-Tech Science Systems Corporation), an enlarged image of a cross section of the foam was taken and subjected to image analysis to determine the average foam cell diameter (μm). The number of foam cells analyzed was about 10 to 20. In the same manner, the smallest foam cell diameters (μm) and the largest foam cell diameters (μm) of the foam sheets were determined.

[Density of Foam Sheet]

The foam sheets were measured for density (apparent density) based on the method described in JIS K 7222:1999. In particular, each foam sheet was punched out into a size of 100 mm by 100 mm to prepare a specimen and the dimensions of the specimen were measured. Using a 1/100 dial gauge with a 20 mm diameter measurement terminal, the thickness of the specimen was measured. From these values, the volume of the foam sheet specimen was determined. The specimen was weighed by a top-loading balance with 0.01 g readability From these values, the apparent density (g/cm$^3$) of the foam sheet was determined.

[Impact Absorption of Foam Sheet]

With respect to the foam sheets A and B obtained above, test pieces cut to 20 mm by 20 mm were obtained; by employing the pendulum impact tester and the method used in Example 1 in Japanese Patent Application Publication No. 2006-47277, impact-absorbing tests were conducted at a temperature of 23° C., with a 28 g bob, at a release (swing-up) angle of 40°. The impact absorption of each foam sheet was determined by the equation below:

$$\text{Impact-absorbing rate (\%)} = \{(F0-F1)/F0\} \times 100$$

In the equation, F0 is the impact force exerted when only a support plate was hit with the bob; F1 is the impact force exerted when a structure formed of the support plate and the foam sheet specimen was hit on the support plate with the bob. The results are shown in Table 1. As shown Table 1, both foam sheets A and B exhibited good impact-absorbing properties.

[Compressive Stress (Hardness) of Foam Sheet]

The foam sheets were measured for 50% compressive stress (hardness) based on JIS K 6767:1999. In particular, each of the foam sheets A and B obtained above was cut out into 100 mm by 100 mm pieces. These pieces were layered to a total thickness of at least 2 mm and the resultant was used as a measurement sample. At room temperature, using a compression tester, the measurement sample was compressed at a rate of 10 mm/min. The value (resilience in N/cm$^2$) of the measurement sample after held at 50% compression (when compressed to 50% of its initial thickness) for 10 seconds was recorded as the 50% compressive stress. Other conditions (e.g. jig and calculation method, etc.) conformed to JIS K 6767:1999. The results are shown in Table 1.

TABLE 1

|  | Foam sheet A | Foam sheet B |
| --- | --- | --- |
| Species | Acrylic | PP-based |
| Density (g/cm$^3$) | 0.34 | 0.12 |
| Average foam cell diameter (μm) | 45 | 60 |
| Thickness (μm) | 100 | 100 |
| Impact absorption (%) | 33 | 26 |
| 50% Compressive stress (N/cm$^2$) | 2.3 | 1.2 |

EXAMPLES

Examples 1 to 3

To a reaction vessel equipped with a stirrer, thermometer, nitrogen inlet, condenser and addition funnel, were added 70 parts of n-butyl acrylate, 30 parts of 2-ethylhexyl acrylate, 3 parts of acrylic acid, 0.08 part of azobisisobutyronitrile as the polymerization initiator and toluene as the polymerization solvent. At 60° C., solution polymerization was carried out for six hours to obtain an acrylic polymer toluene solution (28 Pa·s viscosity 40% solid content). The acrylic polymer was 44×10$^4$ in Mw. To 100 parts of the acrylic polymer in the toluene solution, were admixed 30 parts of a polymerized rosin pentaerythritol ester (product name PENSEL D-125 available from Arakawa Chemical Industries, Ltd. softening point 125° C.) and 2 parts of an isocyanate-based crosslinking agent (product name CORONATE L available from Nippon Polyurethane Industry Co., Ltd.) to prepare an acrylic PSA composition.

APET film substrate (product name LUMIRROR available from Toray Industries, Inc.) of 2 μm thickness was obtained. To the corona-treated face of the PET substrate, the PSA composition was applied to a thickness of 2 μm after dried. By a scraping method using a comb-like scraper, the PSA layer was partially removed in a wavy stripe and a release liner was further layered on top. The resultant was allowed to dry at 100° C. for two minutes. The resulting structure was passed once through a laminator (0.3 MPa, 0.5 m/min speed) at 80° C. and allowed to age in an oven at 50° C. for one day PSA sheets according to the respective Examples were thus obtained, with wavy stripe patterns of grooves formed on the PSA layer surfaces as shown in FIGS. 1 and 2. Table 2 shows the groove width (mm), groove depth (μm), groove interval (width of PSA section between grooves) (mm), amplitude (mm), and pitch (mm) in relation to each Example.

Examples 4 to 6

The thickness of the PSA layer, the groove depth and the thickness of the PET substrate were changed as shown in Table 2. Otherwise in the same manner as Example 2, the PSA sheets according to the respective Examples were obtained.

Example 7

In place of the PET film (38 μm thick) subjected to release treatment on one face, the PET film (100 μm thick) used in Example 5 was used. Otherwise, by the same method as in Fabrication Example 1, an acrylic foam layer (100 μm thick) was formed on the PET film to fabricate a laminate substrate sheet with the PET layer and foam layer. The PET layer-side surface of the substrate sheet was subjected to corona discharge treatment. In the same manner as in Example 5, to the corona-treated surface, the PSA layer was adhered to obtain a PSA sheet according to this Example.

Examples 8 and 9

As the substrate sheets, the foam sheets A (Ex. 8) and B (Ex. 9) were used. Otherwise in the same manner as Example 5, PSA sheets according to the respective Examples were obtained.

Examples 10 to 12

No grooves were formed, but otherwise in the same manner as Examples 1, 7 and 9, PSA sheets according to Examples 10, 11 and 12 were obtained, respectively.

[To-SUS 180° Peel Strength]

The to-SUS 180° peel strength of the PSA sheet according to each Example was evaluated. In particular, a measurement sample was cut out to a 25 mm wide by 100 mm long size from the PSA sheet. In an environment at 23° C., 50% RH, the measurement sample was press-bonded over its adhesive surface to the surface of a stainless steel plate (SUS304BA plate) with a 2 kg roller moved back and forth once. This was left standing in the same environment for 30 minutes. Using a universal tensile/compression tester, based on JIS Z 0237:2000, the peel strength (N/25 mm) was measured at a tensile speed of 300 mm/min at a peel angle of 180°. The results are shown in Table 2.

[Evaluation of Air Release Properties]

With respect to the PSA sheet according to each Example, air release properties were visually inspected when the sheet was applied to the flat surface of an adherend. PSA sheets that resulted in no trapped air in the interface between the PSA sheet and the adherend were graded "Pass"; Examples with the presence of trapped air observed in the adhered area were graded "Fail." With respect to the Examples graded "Pass" in the visual inspection, the air-releasing speed was further graded on the following four levels. The results are shown in Table 2.

A: Fastest air release among test samples
B: Fast release of air from adhered area after application to adherend
C: Relatively slow release of air from adhered area after application to adherend
D: Air released after application to adherend, but considerably slow release

TABLE 2

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|
| PSA layer | Thickness (μm) | 2 | 2 | 2 | 3 | 20 | 80 | 20 | 20 | 20 | 2 | 20 | 20 |
| Substrate sheet | Type | PET Film | PET film | PET film | PET film | PET film | PET film | PET film/ Acrylic foam | Acrylic foam | PP foam | PET film | PET film/ Acrylic foam | PP foam |
|  | Thickness (μm) | 2 | 2 | 2 | 4 | 100 | 100 | 200 | 100 | 100 | 2 | 200 | 100 |
| Pattern | Groove width (mm) | 0.1 | 1.0 | 1.0 | 1.0 | 1.0 | 1.0 | 1.0 | 1.0 | 1.0 | — | — | — |
|  | Groove interval (mm) | 40 | 40 | 40 | 40 | 40 | 40 | 40 | 40 | 40 | — | — | — |
|  | Groove depth (μm) | 1.8 | 1.8 | 1.8 | 1.8 | 18 | 70 | 18 | 18 | 18 | — | — | — |
|  | Amplitude (mm) | 50 | 50 | 30 | 50 | 50 | 50 | 50 | 50 | 50 | — | — | — |
|  | Pitch (mm) | 100 | 100 | 100 | 100 | 100 | 100 | 100 | 100 | 100 | — | — | — |
| Peel strength (N/25 mm) |  | 2.3 | 2.2 | 2.2 | 3.5 | 5.0 | 30.0 | 5.0 | 5.0 | 5.0 | 2.5 | 5.5 | 5.5 |
| Air release properties |  | Pass | Pass | Pass | Pass | Pass | Pass | Pass | Pass | Pass | Fail | Fail | Fail |
| Air release level |  | D | C | C | C | B | A | B | B | B | — | — | — |

Although specific embodiments of the present invention have been described in detail above, these are merely for illustrations and do not limit the scope of the claims. The art according to the claims includes various modifications and changes made to the specific embodiments illustrated above.

REFERENCE SIGNS LIST

1: PSA sheet
1A: adhesive surface
10: substrate sheet
20: PSA layer
26a, 26b, 26c, 26d: grooves

The invention claimed is:

1. A release liner-supported pressure-sensitive adhesive sheet, comprising:
    an air-impermeable pressure-sensitive adhesive sheet having an adhesive surface, comprising:
    a pressure-sensitive adhesive layer forming the adhesive surface, wherein
    two or more grooves are formed in the adhesive surface,
    the grooves run in a wavy shape in the adhesive surface,
    a groove next to a width-direction edge of the pressure-sensitive adhesive sheet among the two or more grooves reaches the edge at an angle that intersects the edge, and
    depths of the grooves are greater than 70% of the thickness of the pressure-sensitive adhesive layer; and
    a release liner that protects the adhesive surface of the pressure-sensitive adhesive sheet, wherein
    a release surface of the release liner is formed smooth, and has an arithmetic average surface roughness of 1 μm or less.

2. The release liner-supported pressure-sensitive adhesive sheet according to claim 1, wherein the two or more grooves are placed at intervals in the adhesive surface.

3. The release liner-supported pressure-sensitive adhesive sheet according to claim 1, wherein the grooves are formed in a curve in the adhesive surface.

4. The release liner-supported pressure-sensitive adhesive sheet according to claim 1, wherein the grooves are formed on the pressure-sensitive adhesive layer.

5. The release liner-supported pressure-sensitive adhesive sheet according to claim 1, further comprising a substrate sheet that supports the pressure-sensitive adhesive layer.

6. The release liner-supported pressure-sensitive adhesive sheet according to claim 5, wherein the substrate sheet comprises a resin sheet layer.

7. The release liner-supported pressure-sensitive adhesive sheet according to claim 1, wherein the pressure-sensitive adhesive layer has a thickness of 2 μm or larger.

8. The release liner-supported pressure-sensitive adhesive sheet according to claim 1, wherein the pressure-sensitive adhesive sheet has an overall thickness of 300 μm or smaller.

9. The release liner-supported pressure-sensitive adhesive sheet according to claim 1 to be applied to an adherend using an automated applicator.

10. The release liner-supported pressure-sensitive adhesive sheet according to claim 1 for use in application to an article.

11. The release liner-supported pressure-sensitive adhesive sheet according to claim 1 wherein the substrate sheet comprises a foam layer.

12. The release liner-supported pressure-sensitive adhesive sheet according to claim 1, wherein the two or more grooves form a wavy stripe pattern.

13. The release liner-supported pressure-sensitive adhesive sheet according to claim 1, wherein the widths of the grooves are 0.3 mm to 5 mm.

14. The release liner-supported pressure-sensitive adhesive sheet according to claim 1, wherein the interval of the grooves is within a range of 1 mm to 100 mm.

15. The release liner-supported pressure-sensitive adhesive sheet according to claim 1, wherein the amplitude of the wavy pattern is within a range of 5 mm to 200 mm.

16. The release liner-supported pressure-sensitive adhesive sheet according to claim 1, wherein the repeating pitch of the wavy shape is 30 mm to 500 mm.

17. The release liner-supported pressure-sensitive adhesive sheet according to claim 1, wherein the pressure-sensitive adhesive layer is an acrylic pressure-sensitive adhesive layer that comprises an acrylic polymer as its base polymer, the acrylic polymer is a polymer of a monomeric starting material comprising an alkyl (meth)acrylate as a primary monomer and a secondary monomer copolymerizable with the primary monomer, the alkyl (meth)acrylate includes at least one of n-butyl acrylate or 2-ethylhexyl acrylate, the secondary monomer is at least one species selected from the group consisting of carboxy group-containing monomers, hydroxy group-containing monomers, acid anhydride group-containing monomers, amide group-containing monomers, amino group-containing monomers, and monomers having nitrogen-containing rings, and the amount of the secondary monomer is 0.5% to 30% by weight of all monomers in the acrylic polymer.

* * * * *